United States Patent
Devgan

(10) Patent No.: US 9,465,752 B2
(45) Date of Patent: Oct. 11, 2016

(54) SYSTEMS AND/OR METHODS FOR POLICY-BASED ACCESS TO DATA IN MEMORY TIERS

(71) Applicant: Software AG USA, Inc., Reston, VA (US)

(72) Inventor: Manish Devgan, Herndon, VA (US)

(73) Assignee: Software AG USA, Inc., Reston, VA (US)

( * ) Notice: Subject to any disclaimer, the term of this patent is extended or adjusted under 35 U.S.C. 154(b) by 131 days.

(21) Appl. No.: 14/569,026

(22) Filed: Dec. 12, 2014

(65) Prior Publication Data

US 2016/0170911 A1 Jun. 16, 2016

(51) Int. Cl.

| G06F 12/00 | (2006.01) |
|---|---|
| G06F 13/00 | (2006.01) |
| G06F 13/28 | (2006.01) |
| G06F 12/14 | (2006.01) |
| G06F 12/08 | (2016.01) |

(52) U.S. Cl.
CPC ....... *G06F 12/1483* (2013.01); *G06F 12/0897* (2013.01); *G06F 12/1458* (2013.01); *G06F 12/0815* (2013.01); *G06F 12/0866* (2013.01); *G06F 12/0868* (2013.01); *G06F 2212/1052* (2013.01); *G06F 2212/60* (2013.01)

(58) Field of Classification Search
CPC .......... G06F 12/1458; G06F 12/1483; G06F 12/1491; G06F 12/0897; G06F 12/0815; G06F 12/0866; G06F 12/0868; G06F 2212/1052; G06F 2212/60; G06F 3/068; G06F 3/0685

USPC ......... 711/118, 145, 150–152, 163, 113, 103
See application file for complete search history.

(56) References Cited

U.S. PATENT DOCUMENTS

| 5,450,563 A * | 9/1995 | Gregor ................ G06F 12/0875 |
| | | 711/118 |
| 7,650,633 B2 | 1/2010 | Whitson |
| 2006/0089932 A1 | 4/2006 | Buehler et al. |
| 2013/0339407 A1* | 12/2013 | Sharpe .............. G06F 17/30194 |
| | | 707/827 |

FOREIGN PATENT DOCUMENTS

| EP | 1 989 656 | 11/2008 |
| WO | 2007/088510 | 9/2007 |
| WO | 2007/105098 | 9/2007 |
| WO | 2008/063417 | 5/2008 |

* cited by examiner

*Primary Examiner* — Yong Choe
*Assistant Examiner* — Shane Woolwine
(74) *Attorney, Agent, or Firm* — Nixon & Vanderhye PC

(57) ABSTRACT

Certain example embodiments provide efficient policy-based access to data stored in memory tiers, including volatile local in-process (L1) cache memory of an application and at least one managed (e.g., non-volatile) in-memory (L2) cache. Operations include receiving an access request for access to a data element in L2; detecting whether a copy of the data element is in L1; if so, copying the data element and the access policy from L2 to L1 and providing the user with access to the copy of data element from L1 if the access policy allows access to the user; and if not, determining, by referring to a copy of the access policy stored in L1, whether the user is allowed to access the data element, and, if the user is allowed to access the data element, providing the user with access to the copy of the data element from the L1 cache memory.

23 Claims, 11 Drawing Sheets

SYSTEMS AND/OR METHODS FOR POLICY-BASED ACCESS TO DATA IN MEMORY TIERS

TECHNICAL FIELD

Certain example embodiments described herein relate to techniques for computer software processing. More particularly, certain example embodiments relate to techniques for providing efficient policy-based access to data stored in tiered memory structures.

BACKGROUND AND SUMMARY

In-memory data platforms such as IMDGs (In-Memory Data Grids) can serve as an operational store for applications that require low latency access to data at scale. Many in-memory data platforms store large datasets and include a cluster of servers forming a grid.

Many applications leveraging such in-memory data platforms store, manage, and analyze security-sensitive data, and it would be desirable to protect such data from unauthorized user and system access, for example. Access control oftentimes is based on authenticated user credentials. Sometimes it is desired that contextual information associated to the caller (e.g., user or device requesting access to the data) is also used in making the access control determination.

Currently available in-memory data platforms typically access an external server to look up authorization information for users requesting access to data stored in the in-memory data platform. Thus, additional latency typically is incurred when policy-based authenticated access is required. It will be appreciated that it would be desirable to optimize the speed at which data in in-memory data platforms is accessed, e.g., by reducing the time associated with looking up such access policies.

In order to improve the speed of access to data stored in tiered memory such as in in-memory data platforms, certain example embodiments described herein provide a highly-optimized approach to authorizing and protecting in-memory data based on a requestor's role and contextual information. Certain example embodiments help optimize or otherwise improve role-based access control without compromising the predictable (and generally low) latency provided by in-memory based data access by bringing the access policies closer to the requestor process space.

In certain example embodiments, there is provided a system for providing controlled access to data stored in a plurality of memory tiers, including a volatile local in-process (L1) cache memory of an application executing on a first computing device and at least one managed (e.g., non-volatile) in-memory (L2) cache on a second computing device, distributed over a plurality of computing devices. The system includes one or more communication interfaces. A processing system includes at least one processor, with the processing system being configured to control the system to access the L1 cache memory and to access the at least one L2 cache via the one or more communication interfaces, and to perform operations comprising: receiving an access request, via the one or more communication interfaces, requesting access for a user to a data element in the memory tiers, wherein the L2 cache has stored therein the data element and an access policy; detecting whether a copy of the data element is in the L1 cache memory; in response to a detection that a copy of the data element is not in the L1 cache memory, copying the data element and the access policy from the L2 cache to the L1 cache memory and providing the user with access to the copy of data element from the L1 cache memory if the access policy allows access to the user; and in response to a detection that a copy of the data element is in the L1 cache memory, determining, by referring to a copy of the access policy stored in the L1 cache memory, whether the user is allowed to access the data element, and, in response to a determination that the user is allowed to access the data element, providing the user with access to the copy of the data element from the L1 cache memory.

In certain example embodiments, a method for providing controlled access to data stored in a plurality of memory tiers distributed over a plurality of computing devices is provided. The tiers include a volatile local in-process (L1) cache memory of an application executing on a first computing device and at least one managed (e.g., non-volatile) in-memory (L2) cache on a second computing device. An access request that requests access for a user to a data element in the memory tiers is received via one or more communication interfaces of the first computing device. The L2 cache has stored therein the data element and an access policy. A detection is made as to whether a copy of the data element is in the L1 cache memory. In response to a detection that a copy of the data element is not in the L1 cache memory, the data element and the access policy is copied from the L2 cache to the L1 cache memory and the user is provided with access to the copy of data element from the L1 cache memory if the access policy allows access to the user. In response to a detection that a copy of the data element is in the L1 cache memory, a determination is made, by referring to a copy of the access policy stored in the L1 cache memory, as to whether the user is allowed to access the data element, and, in response to a determination that the user is allowed to access the data element, the user is provided with access to the copy of the data element from the L1 cache memory.

In certain example embodiments, there is provided a non-transitory computer-readable storage medium having stored thereon instructions that, when executed by a processor of a first computing device, causes the first computing device to provide controlled access to data stored in a plurality of memory tiers, including a volatile local in-process (L1) cache memory of an application executing on the first computing device and at least one managed (e.g., non-volatile) in-memory (L2) cache on a second computing device. The instructions involve operations comprising: receiving an access request, via one or more communication interfaces of the first computing device, requesting access for a user to a data element in the memory tiers, wherein the L2 cache has stored therein the data element and an access policy; detecting whether a copy of the data element is in the L1 cache memory; in response to a detection that a copy of the data element is not in the L1 cache memory, copying the data element and the access policy from the L2 cache to the L1 cache memory and providing the user with access to the copy of data element from the L1 cache memory if the access policy allows access to the user; and in response to a detection that a copy of the data element is in the L1 cache memory, determining, by referring to a copy of the access policy stored in the L1 cache memory, whether the user is allowed to access the data element, and, in response to a determination that the user is allowed to access the data element, providing the user with access to the copy of the data element from the L1 cache memory.

According to certain example embodiments, the at least one managed in-memory (L2) cache may be non-volatile.

According to certain example embodiments, the access policy may specify at least an entity or at least one type of entity for whom access to the data element is allowed, and the determining may determine that the user is allowed to access the data element based upon evaluating the user as corresponding to the at least one entity or the at least one type of entity.

According to certain example embodiments, the determining may comprise: detecting one or more additional parameters associated with the access request, the additional parameters being different from a unique identifier for the user; and performing the determining based upon the one or more additional parameters and the unique identifier. For instance, the one or more additional parameters may include at least one of device information associated with the user and a location of the user.

According to certain example embodiments, in response to a detection that a copy of the data element is in the L1 cache memory, the determining may include applying the access policy to at least one contextual parameter not expressly included in a payload of the access request.

According to certain example embodiments, copying the data element may include storing the copy of the data element in the L1 cache memory in association with a corresponding key and the access policy.

According to certain example embodiments, the corresponding key and a combination of the copy of the data element and the access policy may be stored in the L1 cache memory as a key-value pair.

According to certain example embodiments, the determining may include referring to the access policy specifically associated with the copy of the data element in the L1 cache memory, and copies of other data elements in the L1 cache memory each may be associated with respective other access policies.

According to certain example embodiments, an in memory data grid (IMDG) may be overlaid in the memory tiers, and the IMDG may comprise the L1 cache memory and the L2 cache.

According to certain example embodiments, the operations may further comprise: updating a copy of the access policy in the L1 cache memory; and after updating the copy of the access policy in the L1 cache memory, causing a second processing system to update the access policy in the at least one L2 cache.

According to certain example embodiments, the determining may refer to the copy of the access policy in the L1 cache memory without referencing the access policy in the at least one L2 cache.

According to certain example embodiments, a second processing system including at least one processor may be provided, with the second processing system being configured to control the at least one second computing device and to perform operations comprising: receiving a request to update the data element and/or the access policy; causing at least the first processing system to lock the copy of the data element in the L1 cache memory; updating the data element and/or the access policy in the at least one L2 cache; and synchronizing the data element and the access policy throughout the system.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

As described above, providing authenticated access to data stored in tiered memory structures such as in-memory data platforms may involve looking up access policies associated with the data. In some conventional approaches, accessing data in tiered memory structures, such as in an IMDG, incurs additional delays for looking up the associated access policies at a server that is external to the IMDG. Certain example embodiments described herein provide for eliminating or reducing the delay associated with authorized access to data stored in tiered memory data platforms, such as, but not limited to, in-memory data grids (IMDGs).

Certain example embodiments optimize or otherwise improve access control for data stored in tiered memory data platforms by providing, among other things, a tiered storage of access policies. Certain example embodiments in-line access policies so that they are primarily resident in-memory, for example, by placing the access policies close to the user in the same address space as the application in order to achieve secure data access without sacrificing latency. The in-lining of access policies in certain embodiments accounts for keeping the latency low and possibly even to a minimum and not having to incur the cost of looking up a policy from another repository. Consequently, certain example embodiments, by in-lining access policies with the data, provide faster authenticated access to data than conventional techniques that point to an external store where such access policies are persisted and referenced at runtime.

Certain example embodiments store the data in a key-value pair store in tiered memory where lookups are highly efficient, and provide a mechanism of faulting data when required from one-tier to another. Certain example embodiments also may provide a capability to have a persistent store used for backup and restore. In addition, certain example embodiments provide for leveraging rich contextual information regarding the user and/or the user device in the access control determination. Contextual information may be highly relevant in the area of real-time applications, for example, where tiered memory data platforms oftentimes are used.

According to certain example embodiments, the access policies are in-lined with data by placing them in the in-process memory of the application. Consequently, access to the in-lined policies is independent of the operating system, and is optimized or otherwise improved in ways pertinent to memory tier data platform behavior where predictable latency at any data scale is desirable.

Figure 1:
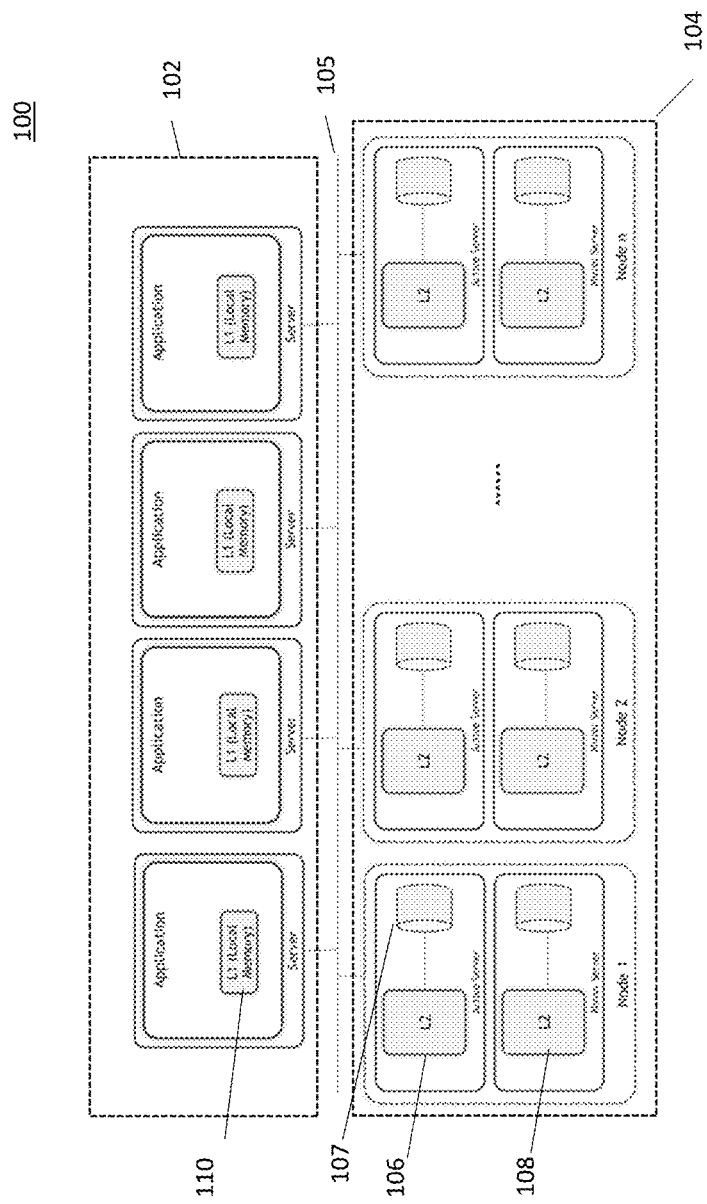
FIG. 1 is a high level illustration of an in-memory data grid (IMDG) environment.

FIG. 1 is a high level block diagram illustrating an IMDG 100 that includes two tiers of data management—(1) "L1— Local Memory" tier (also referred to herein as "L1 tier", "L1", or "L1 cache") that is collocated with the application on one or more first nodes, and (2) "L2" tier (also referred to herein as "L2 tier", "L2", or "L2 cache") that resides on one or more other nodes. The L2 tier contains a superset of data contained in the L1 tier. According to certain example embodiments, the L1 tier stores data in dynamic RAM (DRAM) or other volatile memory, and the L2 layer stores data in a volatile memory or non-volatile memory (e.g., FLASH memory, non-volatile static RAM, etc.). In certain example embodiments, the L2 tier may have disk storage as backup for the purposes such as restartability and persistence for backup and recovery.

In the schematic representation of the IMDG 100 in FIG. 1, a plurality of application servers 102 are connected via a communication infrastructure 105 to a plurality of storage nodes 104. Each application server and each storage node includes a processing system including at least one processor and memory, and is configured to execute program code and to communicate with one or more other devices and/or processes over the communication infrastructure. One or more storage nodes may also include disk or other persistent memory for storing programs and/or data.

Each application server 102 includes an L1 tier memory 110. Each storage node 104 includes an L2 tier memory 106. Each storage node 104 may also include a disk 107 as backup for the L2 tier memory 106. In certain example embodiments, each storage node 104 may include a mirror which duplicates the corresponding L2 tier 108 (and disk, if present).

In the illustrated IMDG 100, the application servers 102 may be physically separate from the storage nodes 104, and the communication infrastructure 105 may provide for communicating over a network such as a wide area network, local area network or other high speed communication medium. In certain example embodiments, the IMDG 100 may be overlaid on a storage area network or server farm. These group of application servers and storage nodes that form an IMDG is sometimes referred to herein as a cluster.

A concept of the optimized or improved approach of certain example embodiments for access control to the data stored in an IMDG involves introducing an access policy in-line with the stored data, e.g., as opposed to having the access policy check performed using an external security repository. An access policy in this sense may, among other things, dictate which security roles have access to the data element. Such an access policy can be implemented as a data structure or a corresponding representation (e.g., a file) that is looked up in order to make a determination as to whether a user should be allowed access to certain data.

Figure 2:
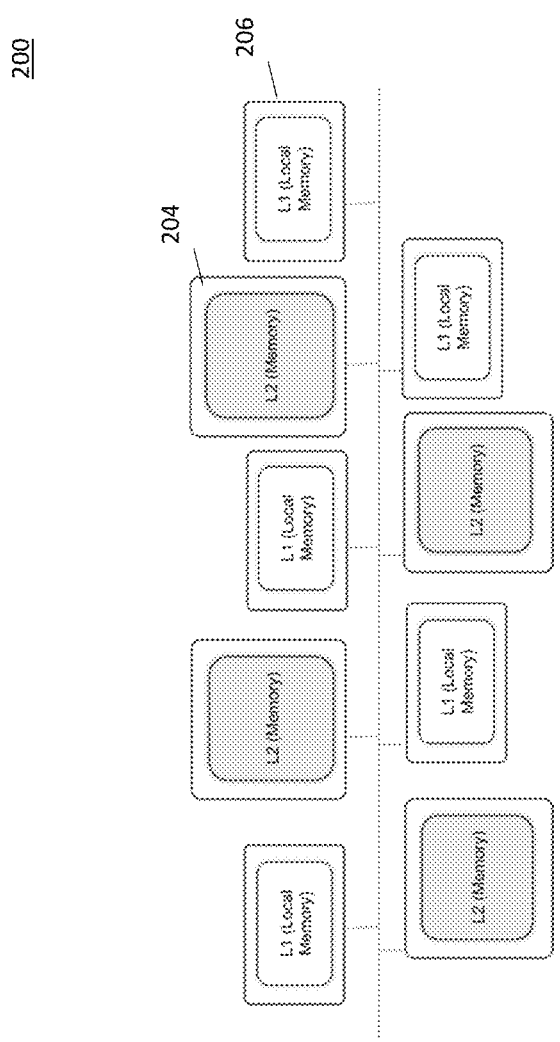
FIG. 2 is another high level illustration of an IMDG.

According to certain example embodiments, policy enforcement is performed at the L1 tier, which is "in-process" of the client application. Because of the nature of certain tiered data storage (e.g., in which the most used data will end up in L1 tier), in-lining of access policy will yield highly optimized or improved performance For example, as illustrated in FIG. 2, in an IMDG comprised of a set of interconnected nodes where a majority of the nodes with applications are equipped with the L1 tier and some nodes are equipped with the L2 tier (L2 tier 204), the majority of access decisions may be made using the L1 tier (e.g., L1 memory 206) because of the collocation of data and corresponding policies in the nodes in which the applications execute. In certain example embodiments, the L2 tier is accessed only when a data item cannot be found in the L1 tier.

Figure 3:
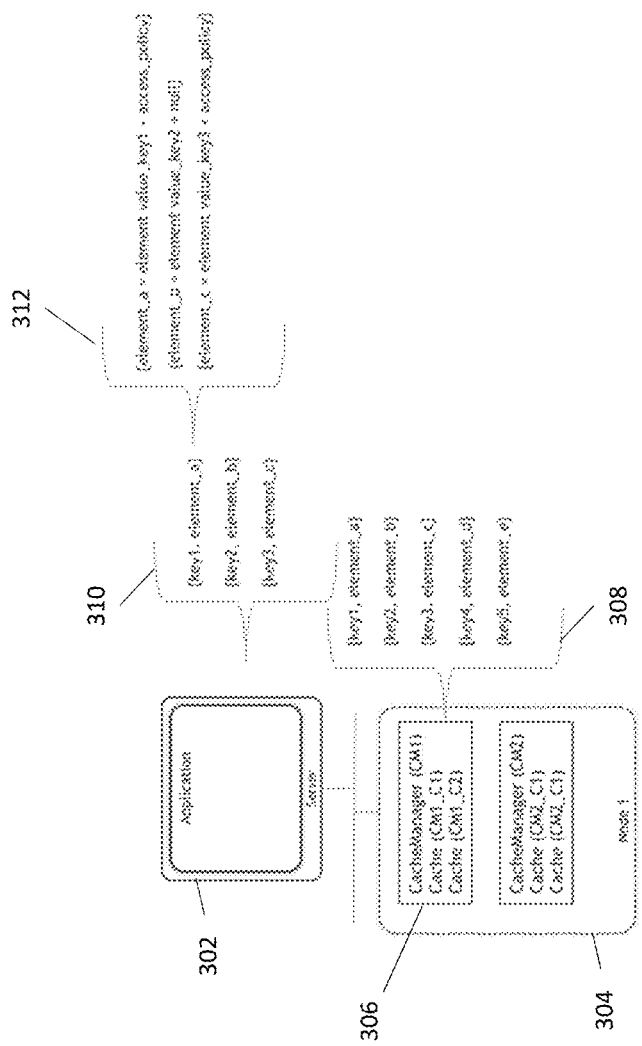
FIG. 3 schematically illustrates a node and a server of an IMDG where the node provides an L2 cache storing a set of key-value pairs and the server provides an L1 cache storing a subset of the key-value pairs, in accordance with certain example embodiments.

FIG. 3 graphically illustrates associating, in the L1 tier, data elements with corresponding access policies. In FIG. 3, a storage node 304, and an application server 302 are shown. The storage node hosts the L2 tier, and the application server hosts the L1 tier. The storage node 304 may include one or more L2 tiers (or L2 caches). FIG. 3 illustrates that the L1 tier stores a subset 310 of the key-value pairs 308 stored in the L2 tier. Arrangement 312 illustrates that in each key-value pair stored in the L1 cache, the data element may include, in addition to the data associated with the key, also the access policy.

As illustrated, each data element may be associated with a respective access policy. In the illustrated embodiment, the access policy for a particular data element is in-lines with the data by embedded in the corresponding key-value pair, such that, when the key for the particular data element is accessed in the L1 tier, the particular data element together with the embedded policy is obtained. When the key-value pairs are stored in the L1 tier in in-process memory of an application, the access policy corresponding to the key-value pair is obtained without a separate lookup in an external server.

The access policy may specify a combination of one or more roles (e.g., a role assigned to a user) and/or a named user. In certain example embodiments, in addition to simple user roles, a set of well-defined attributes that can be present in the request headers may also be part of the access policy. It will be appreciated, however, that the approach described herein is not limited to a particular type of access policy.

According to certain example embodiments, an access engine is a runtime component for processing incoming request to the IMDG that, among other things, (1) returns a value for the given key (element), and (2) throws a predetermined exception (e.g., an AccessViolationException described below) when the requestor is not allowed the requested action according to the access policy.

Once configured, the system will enforce the access policy on a data access request. For example, when a request is received for the value of key key1 and key1 is found in the L1 tier, a determination is made by reviewing the access policy embedded in element_a, which is associated with key1. The access policy may list the user roles that are allowed access or alternatively be defined as a set of roles and actions allowed by those roles. So, a {SalesManager, [read, update]: SalesRep, [read]} may indicate that a user who is in "Sales Manager" role can read and update the value of key1 but others cannot. In certain example embodiments, the access engine determining the access control can be configured to return a decision based on a default policy scheme as well.

In addition to in-lining the access policies with the data in the L1 tier, certain example embodiments provide for parametric authorization using contextual information that may include attributes such as request headers (e.g., header attributes that specify callers device information, location coordinates, etc.).

Figure 4:
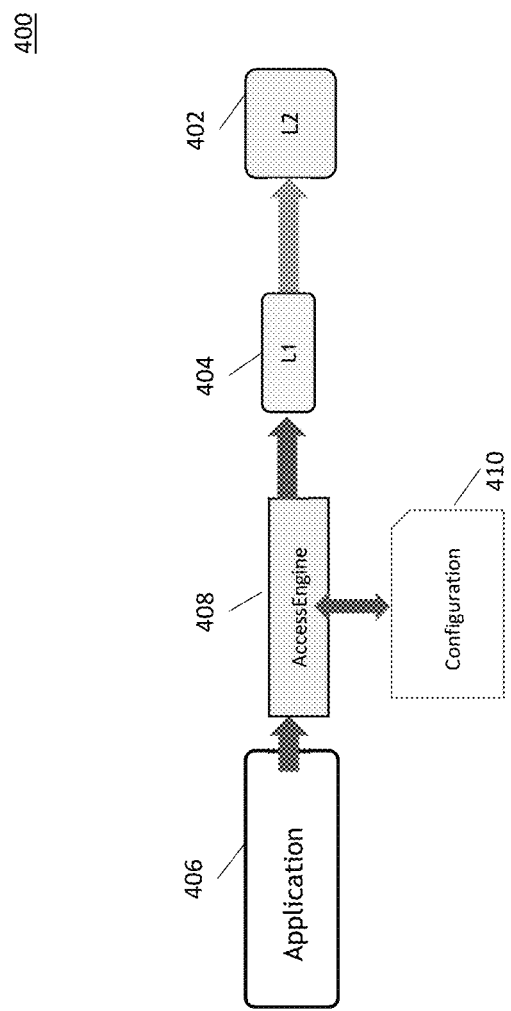
FIG. 4 is a high level block diagram of entities involved in performing policy-based authenticated access to data in an IMDG, in accordance with certain example embodiments.

FIG. 4 illustrates some of the system components 400 involved in authenticated access to data in accordance with embodiments. An IMDG comprises an L2 tier memory 402 and an L1 tier memory 404. The L1 tier memory 404 may physically reside in an application server, and the L2 tier memory 402 may physically reside in a storage server as described in relation to FIG. 1.

When an application 406 executing on the application server requests access to a data element in the IMDG, an access engine 408 is invoked. The access engine 408 may be configured in accordance with a configuration file 410, which includes a default access policy. The access engine provides for first attempting to access the sought data element in the L1 tier 404, and, if it is not found in the L1 tier, looking it up in the L2 tier 404.

Figure 5:
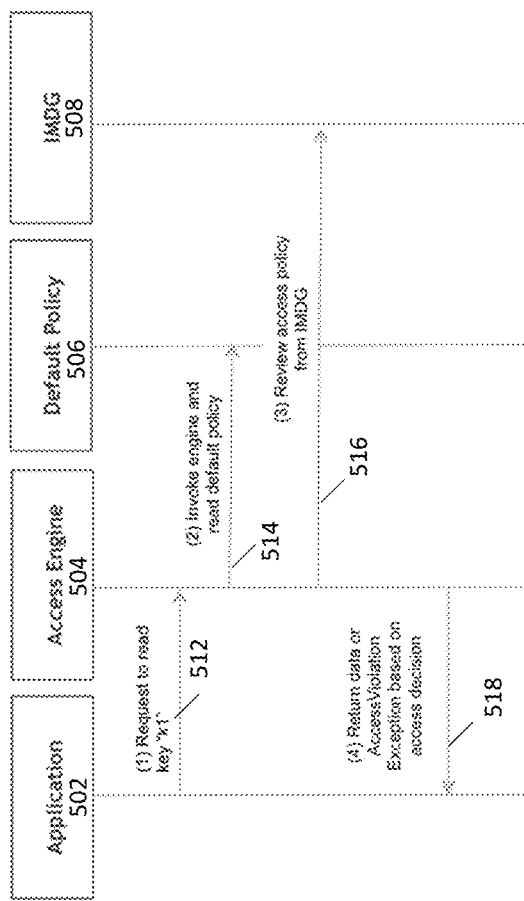
FIG. 5 is an event flow diagram illustrating the policy-based authenticated access to data in an IMDG, according to certain example embodiments.

FIG. 5 is an activity diagram 500 illustrating an event flow, including events between components shown in FIG. 4, that occurs during an authenticated access to data stored in memory tiers, in accordance with certain example embodiments.

Activity diagram 500 illustrates the event flow between application 502, access engine 504, a default access policy 506 and IMDG 508. Application 502 may correspond to application 406, access engine 504 may correspond to access engine 408, default policy 506 may correspond may be included in configuration 410, and IMDG 508 may include L1 tier 404 and L2 tier 402.

In order to access a data element with key kl, at operation 512, application 502 transmits to the access engine 504, a request to read key k1. The request may be generated using any technique such as, for example, an application programming interface (API) call, an inter-process message, etc. At operation 514, upon receiving the request, the access engine 504 may be invoked (e.g., if not already invoked) and the default access policy 506 may be read. The default access policy specifies access controls that should be applied to the requests if the particular data elements do not have their own access policies. The default access policy may specify, for example, if a non-existence of policy constitutes a grant or a deny, or whether all accesses to the data in the IMDG by any user other than an administrator are denied. However, it will be appreciated that example embodiments are not limited to particular types of default access policies.

At operation 516, the access engine 408 obtains the access policy tied to the key from IMDG 508. This may include accessing only the L1 tier 404, or first accessing the L1 tier 404, and if the key k1 if not found in the L1 tier 404, accessing the L2 tier 02. After reading the obtained access policy, a determination is made if the request includes a user context that maps to a role present in the access policy. Thus, because the system first seeks to find the key k1 in L1 and only thereafter seeks the key k1 in L2, the access decision (or access policy enforcement) may be considered as being made at L2, rather than at L1. In certain example embodiments, if the access is denied based upon the access policy, the data will not be faulted to the L1 tier as it is typically done when access is granted.

Alternatively, based upon whether the key k1 is found and based upon the obtained access policy, the access engine 504 returns the data associated with key k1 or an indicator that an access violation occurred (e.g., return an exception such as AccessViolationException indicating that there has been an access violation). In case the data requested is not present, the access engine may be configured to generate an AccessViolationException to inform the user that the data being requested is not available. This behavior is configurable via a default access policy available to the access engine. As noted above, the default access policy can be used to globally define the default access policy with respect to all data elements in the IMDG.

According to an example embodiment, the default access policy can have a policy such as {AuthenticatedRole, [read] }, indicating to the access engine 504 that all authenticated users can read any data from the IMDG.

The AccessViolationException exception, which the access manager may be configured to raise as described above, is an example of an exception that informs the "client" (e.g., the entity executing the request for access) that there has been violation and access has not been granted. A sample API may include, for example: public final Element get(Object key) throws IllegalStateException, CacheException, AccessViolationException.

Another benefit of performing policy enforcement at the L1 tier, which at least in certain example embodiments is in-process of the application, is that it provides the capability for the access control technique to leverage contextual information related to the request. Request attributes may include contextual information that can be part of the policy decision. For example, a request may consist of or comprise location and/or device information that can be utilized as information in addition to the user identification and/or roles to enforce access to given information within the IMDG.

The access policy can be extended to have such contextual information. According to an example embodiment, the access policy defines contextual attributes such as the originating location, the originating device, and/or the originating browser type (e.g., request.location, request.device, request.browser_type, respectively), etc., for the request. The policy enforcement point, when it is at the L1 tier (e.g., in in-process memory of the application), typically has access to this context information and can introspect the values in the current request, and pass the relevant values of such contextual attributes to the access engine. The access engine can then review the access policy and make a determination based on the available context information in addition to the user information.

Figure 6:
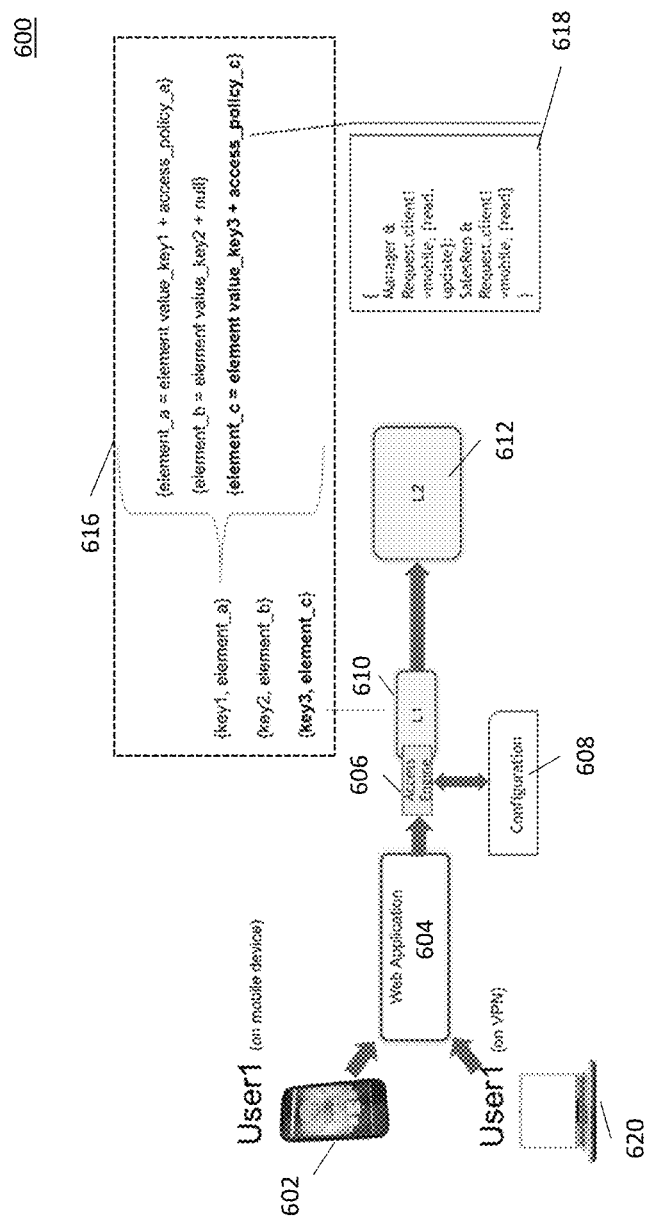
FIG. 6 is a high level block diagram of entities involved in performing policy-based authenticated access to data in an IMDG using contextual information, in accordance with certain example embodiments.

The use of contextual information according to an embodiment is illustrated in FIG. 6. FIG. 6 is an example illustration 600 when contextual information available to the access engine regarding the request is used in order to restrict access to sensitive data in an IMDG depending, for example, on whether a user logs in remotely via standard browser on a laptop or via a mobile device.

As illustrated in the figure, a user via a mobile phone 602 accesses the web application 604. The web application accesses an IMDG, which includes the L1 tier 610 and L2 tier 612 for data. Based upon the request from the mobile telephone 602, the web application 604 requests the IMDG for access to key key3.

The access engine 606, upon receiving the request to access key key3, may read the default access policy 608. If the default access policy 608 authorizes the user to access data in the IMDG, the access engine attempts to find key3 in the IMDG.

According to this example, key3 is found in the L1 tier 610 by the access engine 608. The access engine 608 then reviews the access policy associated with the key3. For example, key3 is identified in the L1 tier 610, and the associated element_c is obtained also from the L1 tier. In certain example embodiments, the element_c in the L1 tier 610 has the access policy (access_policy_c) embedded in it. The embedding of the access policy in the data element may be configured such that when the application accesses the value associated with key3 in L1, the application is provided with access to the access policy.

In the illustrated example, three key-value pairs (e.g., <key1, element_a>, <key2, element_b>, and <key3, element_c>) are shown to be stored in the L1 tier 610. Each of the elements element_a, element_b and element_c may have embedded in it, a respective access policy. Arrangement 616 illustrates the key-value pairs currently residing in the L1 tier 610, and a more detailed illustration of the value part of each key-value. As shown, in the L1 tier 610, element_a includes a data value for element_a and an access_policy_a pertaining to the data value for element_a, element_c includes a data value for element_c and an access_policy_a pertaining to the data value for element_c, and element_b has no access policy currently associated with it.

The access policy may include a rule predicated on client type (e.g., the type of device or user-agent making the request) making the request. Because the access engine 608 is running in the same context as the L1 tier which includes access_policy_c, it can retrieve relevant information from the request. For example, the device type can be obtained from the servlet container, e.g., httpServletRequest.getHeader("user-agent") where the "user-agent" is obtained from information in the request.

Once a determination is made that the "user-agent" pertains to a mobile device, access to key3 may or may not be allowed based upon contextual requirements, if any, in the access policy. For example, if access_policy_c only authorizes users that are in a manager role and who are not making the access request from a device other than a mobile device (e.g., a rule such as Manager & Request.client!=mobile), the access manager 608 would deny the request made by the user from the mobile device 602.

On the other hand, if the same user transmits the request for key3 using a laptop computer 620, access to key3 will be allowed for the user. 618 illustrates an example access policy included in access_policy_c.

According to certain example embodiments, the management of access policies that determine access to data may be performed using standard APIs. The administration of the policies may also be provided using a user interface that provides administrators an ability to manage policies using the standard APIs. Certain example embodiments include an access policy manager that provides a set of APIs that provide for the management of access policies. Example operations may include adding a new access policy to a given key, updating an existing access policy, etc.

Figure 7:
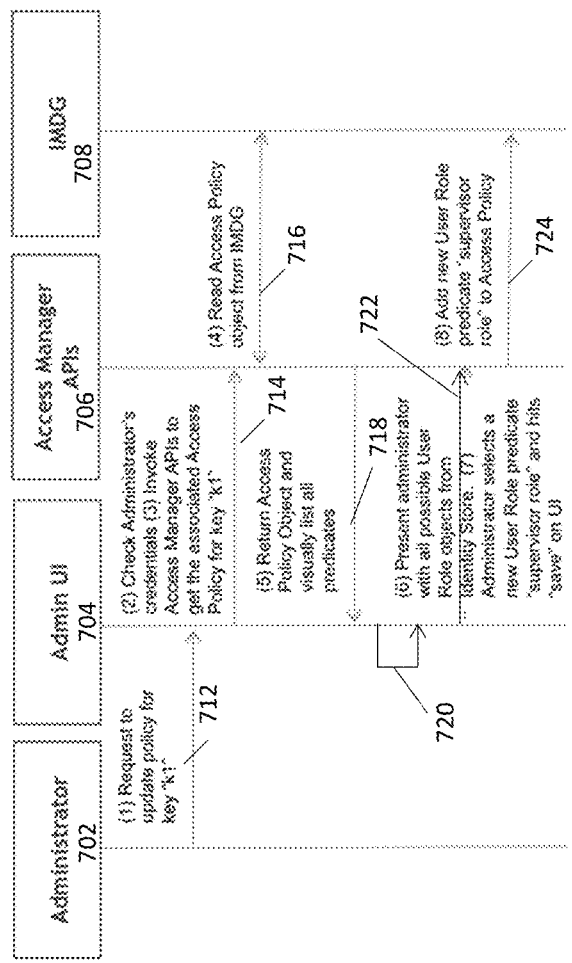
FIG. 7 is an event flow diagram illustrating the updating of an access policy by an administrator, according to certain example embodiments.

According to certain example embodiments, the access policy for a data element is implemented as an access policy object that is associated with the key for the data element. The key used in the access policy object is the same identifier to the data element used in the IMDG. The access policy object (e.g., when implemented in Java) may include following instance variables:

Key: Identifier to the access policy
User: Named user credential
User Role: Names user role (e.g., "manager")
Context Map: A hashtable of key-value pairs where
Key: String representation of the name of the context variable
Value: String representation of the expected value of the context variable FIG. 7 illustrates an example event sequence 700 in which an administrator interacts with an administrative user interface ("admin UI") in order to update an access policy resulting in assigning read privileges to a "supervisor role" to a given data element in IMDG. Example event sequence 700 illustrates the interactions between the administrator 702, the admin UI 704, an access manager API 706, and an IMDG 708.

At operation 712, the administrator 702 requests to update policy for key "k1". Upon receiving the request, the admin UI 704, at operation 714, may check the administrator's credentials, and invoke access manager APIs to get the associated access policy for key "k1".

Upon invocation, or receiving a request from the admin UI 704 for the access policy, the access policy API, at operation 716, reads the access policy object from the IMDG 708.

At operation 718, the access policy API returns an access policy object corresponding to the requested key k1. At operation 720, the admin UI and/or access policy manager API may visually list all predicates, and may also present the administrator with user role objects (e.g., representing all possible roles that can be assigned) from an identity store (not separately shown).

At operation 722, the administrator selects a new user role predicate "supervisor role", and selects "save" on the admin UI 704.

At operation 724, the access policy manager API initiates adding the new user role predicate "supervisor role" to the access policy for key k1.

When a data element is deleted in the IMDG, so too will the associated access policy be deleted. In certain example embodiments, the access policy may be persisted in the persistence store backing L2 (e.g., disk) in case the data needs to be bootstrapped from a system shutdown or refresh.

An example update access policy API according to certain example embodiments may be of the following form: public static void AccessPolicyManager udpate (Object key, AccessPolicy aAccessPolicy) throws AccessPolicyManagementException, AccessViolationException. The Object Key is the key to the data element in the IMDG. AccessPolicy is an Object comprising of predicates like Rolename and well known context parameters. The specified access policy will overwrite the existing AccessPolicy object. AccessPolicyManagementException can be thrown in case when a policy does not already exist. AccessViolationException is thrown when the executing context is not authorized to manage policies.

An example API to create access policies according to certain example embodiments may be as follows: public static void AccessPolicyManager create (Object key, AccessPolicy aAccessPolicy) throws AccessPolicyManagementException, AccessViolationException. The Object Key is the key to the data element in the IMDG. The AccessPolicy is an Object comprising of predicates like Rolename and well known context parameters. AccessPolicyManagementException can be thrown in case when a policy already exists. AccessViolationException can be thrown when the executing context is not authorized to manage policies.

An example API to delete an access policy may be as follows: public static void AccessPolicyManager delete (Object key) throws AccessPolicyManagementException, AccessViolationException. The Object Key is the key to the data element in the IMDG (whose associated policy is to be deleted). The AccessPolicyManagementException can be thrown in case when a policy does not exist. AccessViolationException is thrown when the executing context is not authorized to manage policies.

An example API to read an access policy may be as follows: public static AccessPolicy AccessPolicyManager read (Object key) throws AccessPolicyManagementException, AccessViolationException. The Object Key is the key to the data element in the IMDG. AccessPolicy is an Object comprising of predicates like Rolename and other predefined context parameters. This is returned as a result. AccessPolicyManagementException can be thrown in case when a policy does not already exist. AccessViolationException is thrown when the executing context is not authorized to manage policies.

Certain example embodiments may also include techniques for controlling the runtime environment of the IMDG such that the consistency of the system is maintained while providing for the access policies to be in-lined in L1 tier. The effect of runtime may be determined by the standard consistency modes of the IMDG. In certain example embodiments, at least one of a non-locking mode and a locking mode are supported.

Figure 8:
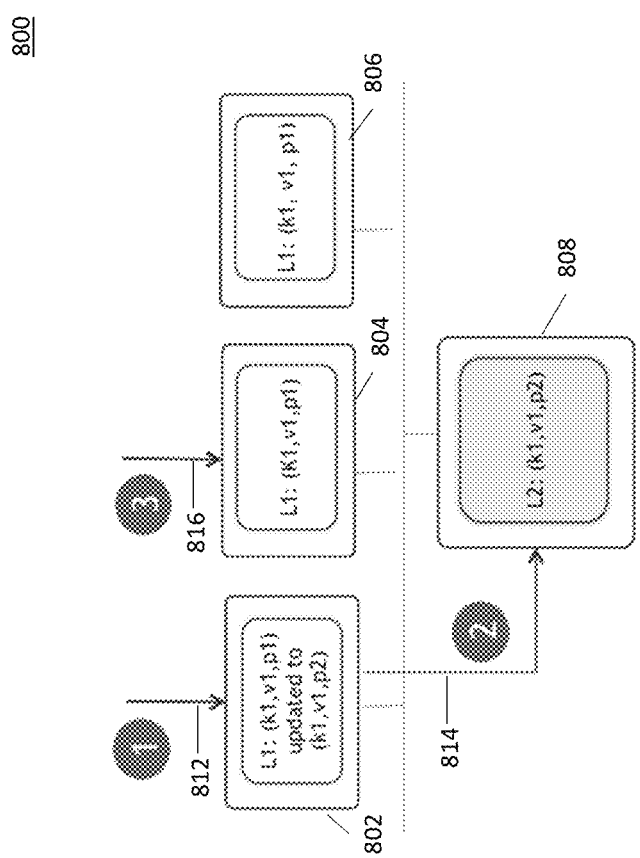
FIGS. 8 and 9 are high level block diagrams illustrating the updating of an access policy using a non-blocking mode within the IMDG, according to certain example embodiments.

FIG. 8 illustrates an event flow 800 for updating an access policy in the non-locking mode according to certain example embodiments. In the non-locking mode, there is no explicit locking or notification to the client accessing data while a policy is being simultaneously updated. The access engine is configured to enforce access restrictions based on what access policy it encounters at the time. In the non-locking mode, the read and write performance is not affected when the access policy is being updated. However, in the non-locking mode an increased risk exists for providing a user with inconsistent data and for enforcing stale policies.

The event flow 800 illustrates the interaction between application servers 802-806, and a storage device 808 and associated example message flow between them during the updating of a policy. Each application server 802-806 includes an L1 tier component of an IMDG. Storage device 808 includes an L2 tier component of the IMDG.

In the illustrated example embodiment, in an initial state before the event flow 800 commences, the L1 tier components 802-806 and the L2 tier component 808 has a copy of key k1, the associated value v1 and access policy p1.

At operation 812, the administrator requests the update of the access policy p1 to p2 at application server 802. In response, in the IMDG, the L1 tier of application server 802 updates its copy of key k1 information to updated the associated access policy from p1 to p2. At operation 814, the IMDG updates the L2 tier at storage device 808 to update its copy of key k1 and the associated access policy to replace p1 with p2. In certain non-locking mode embodiments, the IMDG does not acquire locks of the L1 tier components 804 and 806 before updating L1 tier 802 and L2 tier 808.

Consequently, in the non-locking mode, a request 816 to access data pertaining to key k1 at application servers 804 or 806, made simultaneously (or near simultaneously) with the request 812 to update the access policy p1 at application server 802, can result in returning the value based on a stale associated access policy p1 rather than the updated p2.

Figure 9:
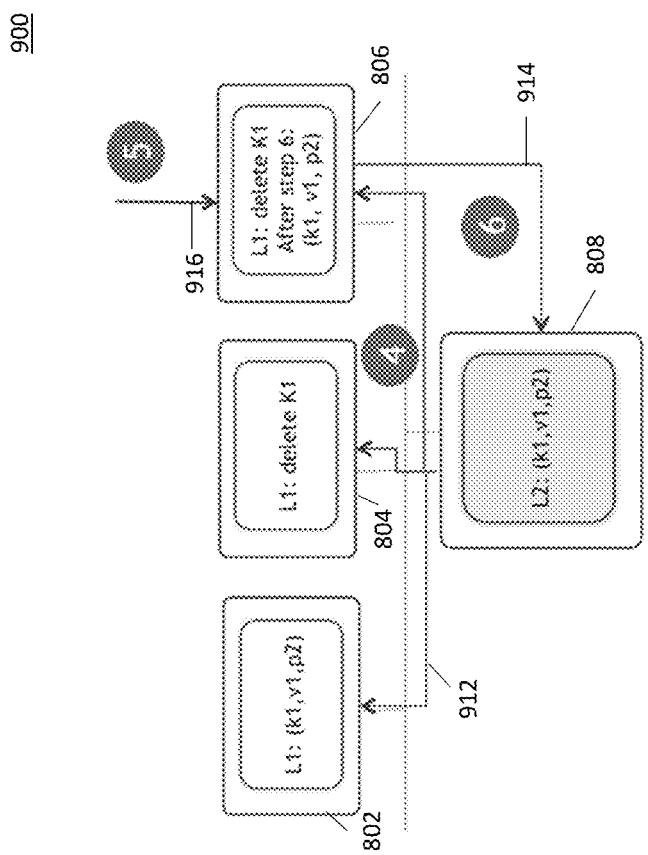

FIG. 9 illustrates an event flow 900 that occurs when, in accordance with the event flow 800 shown in FIG. 8, the L2 tier at the storage device 808 is updated to replace access policy p1 with p2 for key k1. Eventually, the value from L2 invalidates data element pertaining to key k1. The synchronization operation 912 between the L2 tier and L1 tiers may be performed immediately (e.g., as soon as the change is made to the L2 tier) to invalidate stale values in L1 tiers. In response to updating the L2 tier, the synchronization operation may result in all application servers, except the application server which originated the update of key k1, deleting the entry pertaining to key k1. For example, application servers 806 and 808 are caused to delete their copies in the L1 tier of the entries for key k1, whereas the already updated entry for key k1 (with the updated access policy p2) at application server 802 is not deleted.

A subsequent request 914, after the synchronization operation, is received at application server 806 to access data pertaining to key k1. At operation 916, the request received at 914 is sent to L2 where the access policy p2 is enforced.

Figure 10:
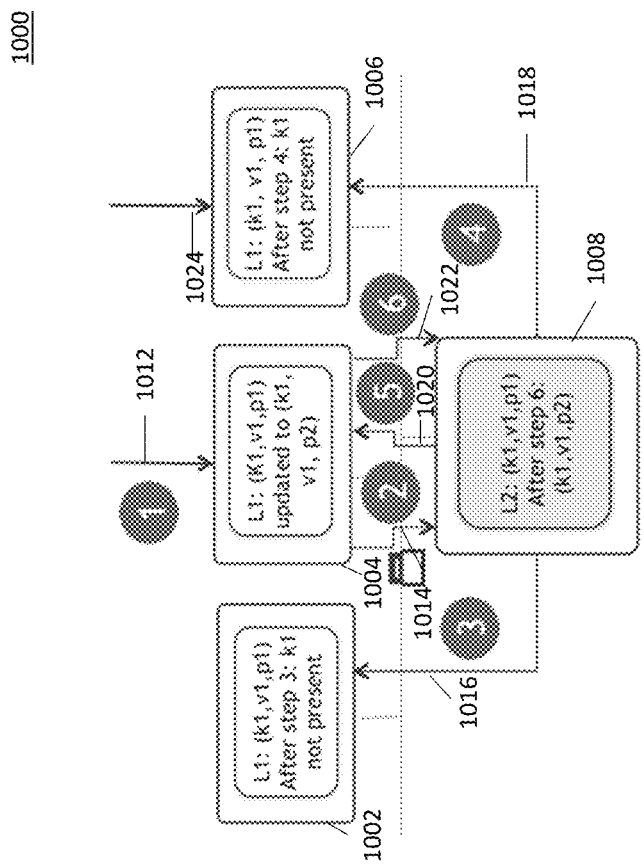
FIGS. 10 and 11 are high level block diagrams illustrating the updating of an access policy using a blocking mode within the IMDG, according to certain example embodiments.

FIG. 10 illustrates an event flow 1000 for updating an access policy in the locking mode, according to certain example embodiments. The locking mode is a mode where explicit locks are acquired at L1 tier components before updating a policy. A cluster-wide lock is obtained both while reading and writing data elements and associated policies. According to certain example embodiments, these cluster locks may be the same as read-write locks but are valid throughout the IMDG cluster. While multiple reads are possible, writes are mutually exclusive to other writes and reads in certain example embodiments.

The event flow 1000 illustrates the interaction between application servers 1002-1006, and a storage device 1008 and associated example message flow between them during the updating of a policy. Application servers 1002-1006 each includes an L1 tier component of an IMDG. Storage device 1008 includes an L2 tier component of the IMDG.

In the illustrated example embodiment, in an initial state before the event flow commences, the L1 tier components 1002-1006 and the L2 tier component 1008 has a copy of key k1, the associated value v1 and access policy p1.

At operation 1012, the administrator updates access policy p1 to p2, at application server 1004. In response, in the IMDG the L1 tier 1004 updates its copy of key k1 and associated data and access policy to replace p1 by p2. At operation 1014, application server 1004 requests a cluster-wide lock for key k1 and associated data element and access policy. The cluster-wide lock may be acquired by the storage device 1008, upon being notified and/or requested to perform as such by application server 1004.

The storage device 1008 operates at operations 1016 and 1018 to cause the invalidation or deletion of the entries for key k1 in the respective L1 tiers at application servers 1002 and 1006. After all the application servers other than the application server at which the administrator updated the entry for key k1, at operation 1020 the cluster-wide lock is granted. In certain example embodiments, during the period when the cluster-wide lock is in place, read/write operations to k1 and its data or access policy are denied. Certain other example embodiments may permit read operations but disallow write operations.

At operation 1022, the key k1 entry at the storage device 1008 L2 tier is updated from access policy p1 to p2. The cluster-wide lock may be released after the L2 tier is updated.

Figure 11:
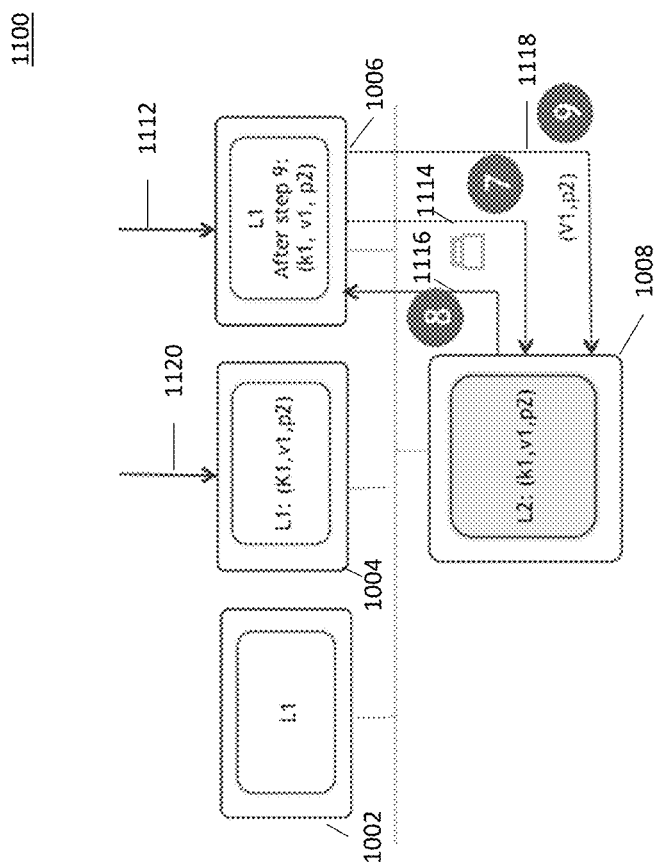

At operation 1024, a read request is received at application server 1008, for which the processing is described in relation to FIG. 11.

FIG. 11 illustrates an example event flow 1100 after a read request 1112 for data pertaining to key k1 is received. Because, the key k1 and its associated data and access policy was invalidated or deleted at operation 1014 (described in relation to FIG. 10) from the application server 1006 L1 tier, the updated key k1 entry with the access policy p2 in the L2 tier at the storage device 1008 must be accessed by the application server 1006.

At operation 1114, the application server 1006 requests a read lock (e.g., transmits a read lock acquire request). At operation 1116, the read lock is granted. At operation 1118, the updated entry for key k1 is read from the L2 tier at the storage device 1008 based upon the updated access policy p2 associated with key k1 in the L2 tier. Subsequently, the L1 tiers are updated with the same updated access policy p2 for future requests. For example, a subsequent request to read key k1 received at application server 1004 results in the key k1 key-value pair along with the updated associated access policy p2 being stored in the L1 tier at application server 1004.

The above example embodiments are described primarily in relation to IMDG. However, the teachings of this disclosure may be applicable to other tiered memory data platforms as well. For example, certain embodiments may apply to tiered memory storage that includes at least one level of caching in addition to a persistent storage for data. Moreover, although certain example embodiments have been described in connection with Java and like languages, it will be appreciated that these languages are merely examples may or may not necessarily correspond to a programming language that is used (or is to be used) in a real system or all embodiments of this invention. Instead, it will be appreciated that the example techniques described herein are not dependent on any specific programming language and/or runtime environment.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having a processor (e.g., central processing unit (CPU) or specialized processor) execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for providing controlled access to data stored in a plurality of memory tiers, including a volatile local in-process (L1) cache memory of an application executing on a first computing device and at least one managed in-memory (L2) cache on a second computing device, distributed over a plurality of computing devices, the system comprising:
   one or more communication interfaces;
   a processing system including at least one processor, the processing system being configured to control the system to access the L1 cache memory and to access the at least one L2 cache via the one or more communication interfaces, and to perform operations comprising:
   receiving an access request, via the one or more communication interfaces, requesting access for a user to a data element in the memory tiers, wherein the L2 cache has stored therein the data element and an access policy;
   detecting whether a copy of the data element is in the L1 cache memory;
   in response to a detection that a copy of the data element is not in the L1 cache memory, copying the data element and the access policy from the L2 cache to the L1 cache memory and providing the user with access to the copy of data element from the L1 cache memory if the access policy allows access to the user; and
   in response to a detection that a copy of the data element is in the L1 cache memory, determining, by referring to a copy of the access policy stored in the L1 cache memory, whether the user is allowed to access the data element, and, in response to a determination that the user is allowed to access the data element, providing the user with access to the copy of the data element from the L1 cache memory.

2. The system according to claim 1, wherein the access policy specifies at least an entity or at least one type of entity for whom access to the data element is allowed, and wherein the determining determines that the user is allowed to access the data element based upon evaluating the user as corresponding to the at least one entity or the at least one type of entity.

3. The system according to claim 1, wherein the determining comprises:
   detecting one or more additional parameters associated with the access request, the additional parameters being different from a unique identifier for the user; and
   performing the determining based upon the one or more additional parameters and the unique identifier.

4. The system according to claim 3, wherein the one or more additional parameters include at least one of device information associated with the user and a location of the user.

5. The system according to claim 1, wherein, in response to a detection that a copy of the data element is in the L1 cache memory, the determining includes applying the access policy to at least one contextual parameter not expressly included in a payload of the access request.

6. The system according to claim 1, wherein copying the data element includes storing the copy of the data element in the L1 cache memory in association with a corresponding key and the access policy.

7. The system according to claim 1, wherein the corresponding key and a combination of the copy of the data element and the access policy is stored in the L1 cache memory as a key-value pair.

8. The system according to claim 1, wherein the determining includes referring to the access policy specifically associated with the copy of the data element in the L1 cache memory, and wherein copies of other data elements in the L1 cache memory are each associated with respective other access policies.

9. The system according to claim 1, wherein an in memory data grid (IMDG) is overlaid in the memory tiers, and wherein the IMDG comprises the L1 cache memory and the L2 cache.

10. The system according to claim 1, wherein the operations further comprise:
    updating a copy of the access policy in the L1 cache memory; and after updating the copy of the access policy in the L1 cache memory, causing a second processing system to update the access policy in the at least one L2 cache.

11. The system according to claim 1, wherein the determining refers to the copy of the access policy in the L1 cache memory without referencing the access policy in the at least one L2 cache.

12. The system according to claim 1, further comprising a second processing system including at least one processor, the second processing system configured to control the at least one second computing device and to perform operations comprising:
receiving a request to update the data element and/or the access policy;
causing at least the first processing system to lock the copy of the data element in the L1 cache memory;
updating the data element and/or the access policy in the at least one L2 cache; and
synchronizing the data element and the access policy throughout the system.

13. The system according to claim 1, wherein the at least one managed in-memory (L2) cache is non-volatile.

14. A method for providing controlled access to data stored in a plurality of memory tiers, including a volatile local in-process (L1) cache memory of an application executing on a first computing device and at least one managed in-memory (L2) cache on a second computing device, distributed over a plurality of computing devices, the method comprising:
receiving an access request, via one or more communication interfaces of the first computing device, that requests access for a user to a data element in the memory tiers, wherein the L2 cache has stored therein the data element and an access policy;
detecting whether a copy of the data element is in the L1 cache memory;
in response to a detection that a copy of the data element is not in the L1 cache memory, copying the data element and the access policy from the L2 cache to the L1 cache memory and providing the user with access to the copy of data element from the L1 cache memory if the access policy allows access to the user; and
in response to a detection that a copy of the data element is in the L1 cache memory, determining, by referring to a copy of the access policy stored in the L1 cache memory, whether the user is allowed to access the data element, and, in response to a determination that the user is allowed to access the data element, providing the user with access to the copy of the data element from the L1 cache memory.

15. The method according to claim 14, wherein the access policy specifies at least an entity or at least one type of entity for whom access to the data element is allowed, and wherein the determining determines that the user is allowed to access the data element based upon evaluating the user as corresponding to the at least one entity or the at least one type of entity.

16. The method according to claim 14, wherein the determining comprises:

detecting one or more additional parameters associated with the access request, the additional parameters being different from a unique identifier for the user; and
performing the determining based upon the one or more additional parameters and the unique identifier.

17. The method according to claim 14, wherein, in response to a detection that a copy of the data element is in the L1 cache memory, the determining includes applying the access policy to at least one contextual parameter not expressly included in a payload of the access request.

18. The method according to claim 14, wherein copying the data element includes storing the copy of the data element in the L1 cache memory in association with a corresponding key and the access policy.

19. The method according to claim 14, wherein the determining refers to the copy of the access policy in the L1 cache memory without referencing the access policy in the at least one L2 cache.

20. The method according to claim 14, wherein an in memory data grid (IMDG) is overlaid in the memory tiers, and wherein the IMDG comprises the L1 cache memory and the L2 cache.

21. The method according to claim 14, wherein the at least one managed in-memory (L2) cache is non-volatile.

22. A non-transitory computer-readable storage medium having stored thereon instructions that, when executed by a processor of a first computing device, causes the first computing device to provide controlled access to data stored in a plurality of memory tiers, including a volatile local in-process (L1) cache memory of an application executing on the first computing device and at least one managed in-memory (L2) cache on a second computing device, by performing operations comprising:
receiving an access request, via one or more communication interfaces of the first computing device, requesting access for a user to a data element in the memory tiers, wherein the L2 cache has stored therein the data element and an access policy;
detecting whether a copy of the data element is in the L1 cache memory;
in response to a detection that a copy of the data element is not in the L1 cache memory, copying the data element and the access policy from the L2 cache to the L1 cache memory and providing the user with access to the copy of data element from the L1 cache memory if the access policy allows access to the user; and
in response to a detection that a copy of the data element is in the L1 cache memory, determining, by referring to a copy of the access policy stored in the L1 cache memory, whether the user is allowed to access the data element, and, in response to a determination that the user is allowed to access the data element, providing the user with access to the copy of the data element from the L1 cache memory.

23. The non-transitory computer-readable storage medium according to claim 22, wherein the at least one managed in-memory (L2) cache is non-volatile.

* * * * *